Patented Oct. 17, 1950

2,526,345

UNITED STATES PATENT OFFICE 2,526,345

PHTHALOCYANINE PIGMENT COMPOSITIONS

Vito A. Giambalvo, Somerville, N. J., assignor to Interchemical Corporation, New York, N. Y., a corporation of Ohio No Drawing. Application February 23, 1946, Serial No. 649,757

8 Claims. (Cl. 106—288)

This invention relates to the production of phthalocyanine pigments and their use in liquid coating compositions such as paints, lacquers and enamels, and aims to provide more useful pigments of this general class.

Despite their remarkable color and brilliancy, in addition to their valuable properties of heat, light and chemical resistance, phthalocyanines have found limited application in the protective coating industry because of the tendency to separate from the other components of the liquid composition, on standing. The trade describes this fault variously as "flooding," "floating," "flocculation." From the viewpoint of colloid chemistry, the defect may be explained by an unfavorable electrical layer at the solid-liquid interface. To be more specific, were an enamel formulated with phthalocyanine blue or green and a white pigment, in a very short time the white will float to the surface, giving an off-color. Or were a phthalocyanine blue and a yellow ground into a green enamel, the blue and the yellow will separate, giving off color.

It is the object of this invention to prepare a phthalocyanine pigment which will be stably dispersed in a liquid composition over a relatively long time, in order to overcome the loss in shade and strength which results when combined with other pigments.

I have found that phthalocyanine mono-sulphonic acid, prepared by treating phthalocyanines with sulphonating agents, such as hot concentrated sulphuric or cold fuming sulphuric acid, when admixed in quantities of the order of 5% or more with unsulphonated phthalocyanines, will stabilize the phthalocyanine dispersion and protect it against flocculation in a conventional paint, lacquer and enamel. The phthalocyanine mono-sulphonic acids can be used to replace all the corresponding unsulphonated phthalocyanine; but as the percentage rises, a tendency toward gelation of the coating composition sets in with some film forming agents. Consequently, I prefer not to use above 80% of the sulphonated product in compositions such as nitrocellulose lacquers, which show tendencies toward gelation. Optimum results are obtained with mixtures of phthalocyanine monosulphonic acid in which the monosulphonic acid constitutes 5 to 40% of the mixture. In other compositions, such as alkyd finishes, the mono-sulphonated product may be even less thixotropic than the unsulphonated pigment.

Care must be taken that the sulphonation should not go beyond the monosulphonic acid; if any substantial amount of disulphonic acid is present, marked water-sensitivity results, making the product undesirable for most coatings.

The sulphonation methods employed should be relatively mild; or some poly-sulphonic acid will be formed. Thus, I prefer to operate with cold fuming acid, instead of hot, as is commonly done in sulphonating. Similar results may be obtained with hot concentrated acid.

The salts of the acids with various metals may be used to replace the acid itself. When alkali metal salts are used, there is an increased tendency to water-solubility. The alkaline earth salts, however, are even less water-sensitive than the acid itself. Other salts may be used, although metals which yield color (e. g. iron) should preferably be avoided.

The following examples are typical of the preparation of satisfactory pigments:

Example 1

10 parts of crude copper phthalocyanine was dissolved in 100 parts of exactly 100.0% $H_2SO_4$ in an iron sulphonator. The solution was heated slowly (over a period of eight hours) to 140° C., and immediately cooled to room temperature to arrest further sulphonation. The solution was struck in a centrifugal pump with 1000 parts of water at 60° C., pressed and washed acid-free in the conventional manner.

Metal-free phthalocyanine can be reacted in identical fashion, as shown in Example 1. Monochlor copper phthalocyanine likewise gives similar results; and the various metal phthalocyanines likewise do so.

These products can be used in coating compositions, as is set forth in the following examples.

Example 2

A lacquer suitable for automotive use was prepared by grinding the following paste in a steel ball mill for 48 hours.

|  | Grams |
|---|---|
| Copper phthalocyanine | 240 |
| 30% ¼ sec. R. S. nitrocellulose dope | 600 |
| #15 blown castor oil | 105 |
| Dibutyl phthalate | 105 |
| Solvent—2 ethylacetate, 1 n-butyl acetate, 1 n-butanol, 6 toluene | 690 |
| Grand total | 1740 |

The above paste was reduced in the following manner:

|  | Grams |
|---|---|
| Above paste | 290 |
| 30% ½ sec. R. S. nitrocellulose dope | 233 |
| Rezyl 99-4 a saturated, "non-oxidizing" type alkyd, 50% solids in toluol | 160 |
| Solvent | 70 |
| Grand total | 753 |

A light "baby blue" tint was made by letting down 20 parts of the above finished lacquer with 100 parts of any white lacquer; after standing five minutes, the blue separated from the white.

*Example 3*

Another lacquer on exactly the same formula as Example 2 was made, except substituting 10% of the copper phthalocyanine with copper phthalocyanine mono-sulphonic acid, as prepared in Example 1. The "baby blue" tint remained stable for two months without separating.

Panels were sprayed three double coats on bare metal to give solid coverings with lacquers of Example 2 and Example 3. The tint containing copper phthalocyanine sulphonic acid was brighter, and possessed 40% extra strength.

*Example 4*

An enamel was prepared on the following formula:

|  | Per cent |
|---|---|
| Copper phthalocyanine | 12.5 |
| Glyptal 2462 (solid) (oil-modified glycerol phthalate resin) | 27.5 |
| Toluol | 39.0 |
| Xylol | 15.8 |
| Petroleum spirits | 5.2 |
| Total | 100.0 |

100.00 grams above paste
45.00 grams Glyptal 2462 (50% solution)
0.70 grams 24% lead nuodex, lead naphthenate type drier
0.30 grams 6% cobalt nuodex, cobalt+ naphthenate type drier The reduced paste was let down with white enamel to a "baby blue" tint; again the blue separated from the white, showing bad flocculation.

*Example 5*

An enamel on exactly the same formula as Example 4, except substituting 10% of the copper phthalocyanine with copper phthalocyanine mono-sulphonic acid, gave a product which was non-flocculating.

*Example 6*

Still another enamel was prepared with the alkyd base of Example 4 but substituting a copper phthalocyanine sulphonate as in Example 1 in place of all the copper phthalocyanine of Example 4. The resultant composition was non-flocculating and a little less thixotropic than the composition of Example 4.

*Example 7*

Another desirable formula is:

|  | Per cent |
|---|---|
| Copper phthalocyanine sulphonated to the mono-sulphonate | 12.5 |
| Glyptal 2462 (solid) (oil-modified glycerol phthalate resin) | 27.5 |
| Toluol | 39.0 |
| Xylol | 15.8 |
| Petroleum spirits | 5.2 |
| Total | 100.0 |

100.00 grams above paste
30.00 grams Glyptal 2462 (50% solution)
15.00 grams Melmac 245–8 (50% solution) (melamine formaldehyde resin)
0.70 grams 24% lead nuodex (lead naphthenate)
0.30 grams 6% cobalt nuodex (cobalt naphthenate)

Finishes based on this formulation are non-flocculating, of good working viscosity and superior weathering characteristics.

Obviously, the examples can be multiplied indefinitely. The lacquers and alkyd resin enamels shown can be replaced by other oily, oleoresinous, resinous and cellulose derivative compositions. The results observed with mixtures of white and blue are just as observable with other mixtures, and ordinary blue lacquers and enamels containing no other pigment will benefit by my treatment.

Furthermore, while I have given only one specific method of sulphonation, any other mild sulphonation may be employed, if care be taken to prevent sulphonation beyond the mono-sulphonic acid.

While the pigment treated in the above instances is copper phthalocyanine blue, other phthalocyanines which flocculate can be similarly treated. Thus, phthalocyanine green (highly chlorinated copper phthalocyanine) flocculates badly without the addition, and its flocculation is prevented by the use of its mono-sulphonate. Other metallic and non-metallic phthalocyanines show similar reaction.

For such subject matter as is common to my copending application Serial No. 557,217, filed October 4, 1944 (and now abandoned), and this application, I claim the benefit of the filing date thereof.

I claim:

1. A non-flocculating liquid organic coating composition comprising a non-aqueous organic liquid coating vehicle, and a phthalocyanine pigment consisting of 5 to 40% of a compound of the class consisting of phthalocyanine mono-sulphonic acid, and its alkali earth metal salts, and 95 to 60% of unsulphonated phthalocyanine, in admixture with another pigment, the composition being characterized by the non-separation of the phthalocyanine and the other pigment.

2. A phthalocyanine pigment which is non-flocculating in liquid nitrocellulose base coating compositions, and which is relatively free from tendencies toward gelation, consisting of 5 to 40% of a compound of the class consisting of phthalocyanine mono-sulphonic acid and its alkali earth metal salts, and 95 to 60% of unsulphonated phthalocyanine.

3. A phthalocyanine pigment which is non-flocculating in liquid organic coating compositions, consisting of 5 to 80% of a compound of the class consisting of phthalocyanine mono-sulphonic acid and its salts, and 95 to 20% of unsulphonated phthalocyanine.

4. A phthalocyanine pigment which is non-flocculating in liquid organic coating compositions, consisting of 5 to 80% copper phthalocyanine mono-sulphonic acid, and 95 to 20% of unsulphonated copper phthalocyanine.

5. A non-flocculating liquid organic coating composition comprising a non-aqueous organic liquid coating vehicle, and a phthalocyanine pigment consisting of 5 to 80% phthalocyanine mono-sulphonic acid, and 95 to 20% of an unsulphonated phthalocyanine.

6. A non-flocculating liquid organic coating composition comprising a non-aqueous organic liquid coating vehicle, and a phthalocyanine pigment consisting of 5 to 80% copper phthalocyanine mono-sulphonic acid, and 95 to 20% of unsulphonated copper phthalocyanine.

7. A non-flocculating liquid organic coating composition comprising a non-aqueous organic liquid coating vehicle, and a phthalocyanine pigment consisting of 5 to 80% of a compound of the class consisting of phthalocyanine mono-sulphonic acid, and its salts, and 95 to 20% of an unsulphonated phthalocyanine, in admixture with another pigment, the composition being characterized by the non-separation of the phthalocyanine and the other pigment.

8. A non-flocculating liquid organic coating composition comprising a non-aqueous organic liquid coating vehicle, and a phthalocyanine pigment consisting of 5 to 80% copper phthalocyanine mono-sulphonic acid, and 95 to 20% of unsulphonated copper phthalocyanine, in admixture with another pigment, the composition being characterized by the non-separation of the phthalocyanine and the other pigment.

VITO A. GIAMBALVO.

REFERENCES CITED

The following references are of record in the file of this patent:

UNITED STATES PATENTS

| Number | Name | Date |
| --- | --- | --- |
| 2,099,690 | Holzach et al. | Nov. 23, 1937 |
| 2,135,633 | Bienert et al. | Nov. 8, 1938 |
| 2,238,243 | Black | Apr. 15, 1941 |
| 2,327,472 | Vesce et al. | Aug. 24, 1943 |

FOREIGN PATENTS

| Number | Country | Date |
| --- | --- | --- |
| 460,147 | Great Britain | June 20, 1936 |